(No Model.)
P. L. CLARK.
PROCESS OF DEVULCANIZING RUBBER.
No. 601,091. Patented Mar. 22, 1898.
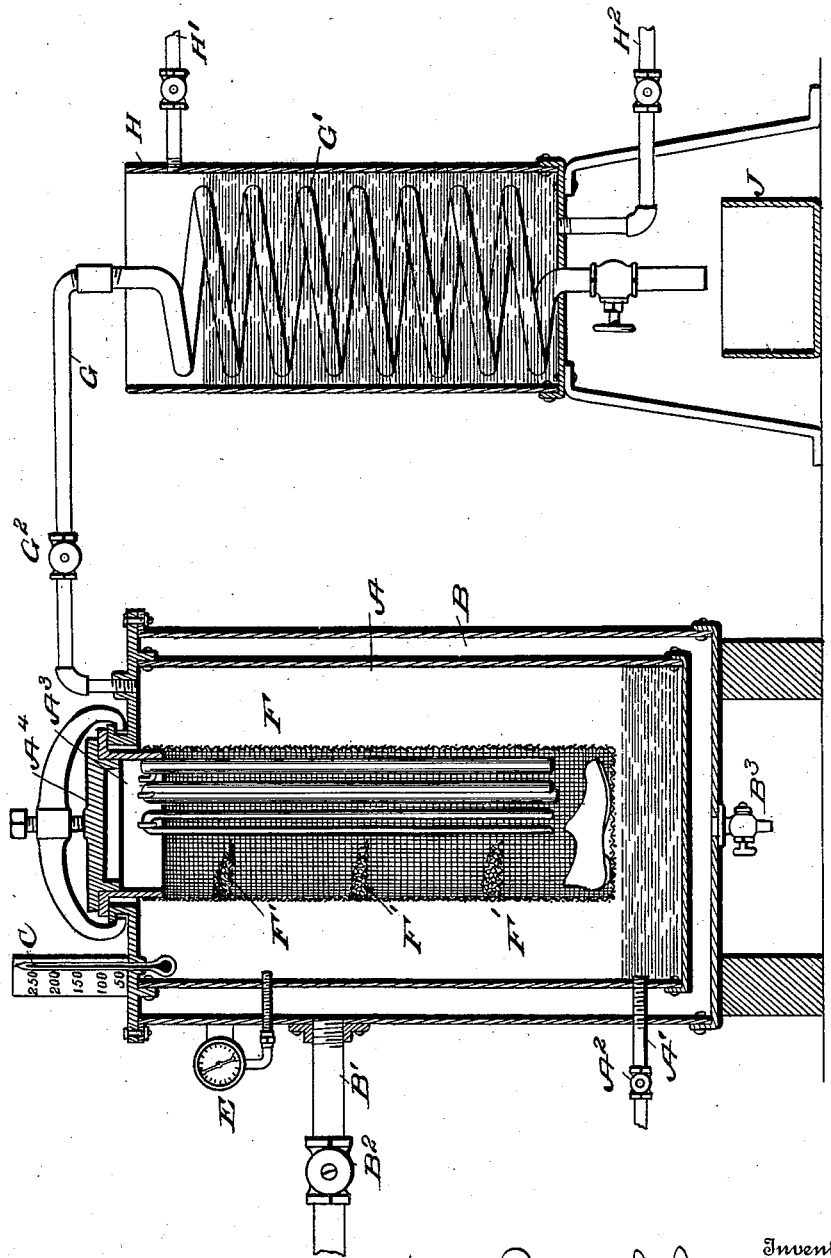

UNITED STATES PATENT OFFICE.

PERCY L. CLARK, OF CHICAGO, ILLINOIS.

PROCESS OF DEVULCANIZING RUBBER.

SPECIFICATION forming part of Letters Patent No. 601,091, dated March 22, 1898.

Application filed August 25, 1897. Serial No. 649,544. (No specimens.)

*To all whom it may concern:*

Be it known that I, PERCY L. CLARK, a citizen of the United States, residing at Chicago, county of Cook, and State of Illinois, have invented certain new and useful Improvements in the Process of Devulcanizing Rubber, which are fully set forth in the following specification, reference being had to the accompanying drawing, forming a part thereof.
The purpose of this invention is to deprive vulcanized rubber of its vulcanized character and adapt it for remolding or other reshaping and for vulcanizing in new form. By experiment I have ascertained that the essential conditions for the attainment of this purpose are the following: first, the employment of a solvent of rubber and sulfur whose boiling or vaporizing point is lower than the point at which rubber is disorganized by heat, which is commonly spoken of as the "melting-point" and which with different grades of rubber varies from a point somewhat below 300° Fahrenheit to a point several degrees above 300° Fahrenheit; second, soaking the vulcanized rubber thoroughly in such solvent; third, maintaining the rubber in a soaked or approximately-saturated condition while exposing it to heat sufficient to vaporize the solvent; fourth, avoiding a degree of heat sufficient to disorganize the rubber.

The best method which I have found for practicing this invention consists in first soaking the rubber thoroughly in such a solvent as gasolene, benzene, or any common grade of naphtha, though I have used kerosene in connection with the more volatile of these oils. The rubber thus soaked I immediately expose to a vapor of a similar solvent, gasolene being the most convenient and satisfactory for this purpose. The chamber being closed, I apply heat sufficient to vaporize the solvent in the chamber and thus completely envelop the rubber which is soaked with solvent, and I have obtained the best results by using such quantity of the solvent in the chamber that considerable pressure may be developed from the vapor of the solvent by a temperature below the disorganizing or melting point of rubber. The exposure of the saturated rubber in the vapor of the solvent at a temperature which in my experiments has varied from 200° to 300° Fahrenheit and sometimes a little above for a period of time which has varied from one hour to three hours and with an indicated pressure ranging from one pound up to one hundred pounds, results in reducing the rubber to a condition which I call "devulcanized," because in that condition it has substantially the qualities of the original unvulcanized rubber with which sulfur has been mixed for the purpose of vulcanization—that is, it can be massed together and sheeted out between rolls and upon being exposed to a proper degree of heat becomes again vulcanized. When this condition is attained, the rubber is removed from the vapor and after a short cooling can be handled and worked.

The apparatus which I have used for the practice of my invention is shown in the drawing, in which the figure is an actual section through two chambers which comprise the apparatus.

In the drawing, A is a chamber to which a proper solvent may be supplied through a pipe A', controlled by a valve A². This chamber is inclosed in a steam-jacket B, through which steam for heating is supplied through a pipe B', controlled by the valve B².

B³ is a drain-cock for the water of condensation. The chamber A has connected with it a thermometer C, adapted for indicating the interior temperature—that is, the temperature of the vaporized solvent.

E is a pressure-gage connected with the vapor-chamber. At the center of the top is a hand-hole A³, provided with a tight cover A⁴, and within the chamber, adapted to be inserted through the hand-hole and suitably suspended, is a wire cage F to contain the rubber articles to be treated. From the upper end of the chamber a pipe G leads to a condensing-coil G', which is inclosed in a cooling-chamber H, supplied with water through a pipe H', and having a waste-pipe H², so that water may be caused to circulate through the chamber to cool the coil G'. The coil drains into a receptacle J. A valve G² controls the pipe G.

No especial apparatus need be illustrated for the purpose of soaking the rubber in the solvent. Any vessel, preferably with a tight cover, will answer the purpose.

The length of time necessary to properly soak the rubber before putting it into the vapor-chamber varies with the quality of the rubber. The visible effect of the soaking is to swell the rubber, and when it ceases to swell it may be known that the soaking is sufficient. It will be found most advisable to continue the soaking until the swelling ceases, because in any event the rubber will dry out somewhat while being transferred from the liquid into the vapor-chamber, for it should be understood that notwithstanding the rubber is thus soaked in the liquid its exterior appearance will be dry, no liquid remaining on the surface and no appearance of moisture being present.

For the purpose of producing the vapor in the vapor-chamber I introduce through the pipe A' a quantity of liquid solvent, preferably gasolene, benzene, or other hydrocarbon having a comparatively low vaporizing-point and having necessarily a vaporizing-point lower than the melting or disorganizing point of rubber. The quantity of liquid solvent thus introduced should be proportioned to the size of the chamber, so that some pressure may be developed in the vapor generated therefrom and occupying the remainder of the chamber above the liquid by a temperature lower than the melting-point of rubber, say lower than 300° Fahrenheit. The liquid, moreover, should not reach the articles to be treated, which are placed within the cage F. These rubber articles may be suspended or deposited loose in the cage. If the rubber to be treated is in fragmentary or granular form, it may be spread upon fine-mesh wire-cloth shelves, (indicated at F',) or if it is in suitable form it may be hung upon rods or hooks provided for that purpose. The hand-hole being now tightly closed and the steam turned into the jacket, the solvent is vaporized, and the air contained in the chamber above the liquid solvent being allowed to escape by momentarily opening the valve G² the entire space above the liquid will become occupied by the vapor. A little experience will enable the operator to supply in the first instance the proper quantity of the particular solvent used in order to develop the most desirable pressure with the most desirable temperature. If, for example, commercial gasolene is used and if with a given quantity in the chamber a temperature of 240° Fahrenheit is found necessary in order to produce a pressure of sixty pounds, the quantity should be increased in order to produce the same pressure at a lower temperature or a higher pressure at the same temperature. Some experience will be necessary in order to enable the operator to determine under varying conditions as to temperature, pressure, and the character of the rubber what length of exposure should be given. In order to afford some guide or suggestion in these respects, I will now give the details of certain of my experiments, and by comparison of them one with another an operator reasonably skilled in the art of rubber manufacture will be able to practice my invention under a wide variety of conditions in these respects.

Experiment A: Into my chamber A, which has a total capacity of about thirty-five gallons, I put five gallons of gasolene, and in the cage F, I exposed inner tubes of bicycle-tires, which are of pure rubber, these having been previously thoroughly soaked in gasolene. I turned the steam into the steam-jacket and in five minutes the thermometer exposed in the vapor indicated a temperature of 96° Fahrenheit and the pressure-gage showed seven pounds. The pressure rose gradually for thirty minutes, and the gage then indicated seventy-three pounds and the thermometer 300° Fahrenheit. At the end of an hour and seven minutes the rubber was removed and found perfectly devulcanized, and by the time it was cooled sufficiently to handle it was in condition to mass perfectly and to be sheeted out between rollers. The average temperature during the entire period of exposure was 181° Fahrenheit. The average pressure was fifty-four pounds, the average temperature having been 224° Fahrenheit at the end of the treatment and the maximum pressure having been eighty pounds.

Experiment B: With substantially the same quantity of gasolene in the chamber and with similar pure rubber tubes previously soaked in gasolene in the same manner five minutes after turning on the steam the gasolene pressure-gage indicated five pounds, and the thermometer in the vapor-chamber indicated 204° Fahrenheit. The pressure and temperature increased gradually for an hour, when the pressure-gage indicated fifty-six pounds and the thermometer 280° Fahrenheit. These conditions prevailed with slight variation until the exposure had continued for one hour and thirty minutes, when the rubber was removed and found in perfect condition for working, as before. The average temperature throughout the entire treatment was 253° Fahrenheit. The average pressure was 42.5 pounds.

Experiment C: The rubber treated in this instance was such as is commonly used for mechanical rubber goods, being twenty-five per cent. pure rubber gum, twenty-five per cent. shoddy rubber, and fifty per cent. earthy material or other filler of neutral character. This rubber was first saturated or soaked in gasolene and in soaked condition was placed in the cage. Six gallons of gasolene was supplied to the chamber, and ten minutes after the steam was turned on the gasolene pressure-gage indicated seven pounds and the thermometer 120° Fahrenheit. The pressure rose to a maximum of sixty-five pounds fifty minutes after commencement and varied between that and sixty pounds at the close. The temperature rose continuously to 277° Fahrenheit at the close. The result was a perfect devulcanization of the rubber, so that it was in condition for working as soon as cool enough to be handled. The total time of exposure was two hours and twenty-three minutes, the average temperature 234° Fahrenheit, and the average pressure forty-eight pounds.

Experiment D: With five gallons of gasolene and rubber of the same character as in experiment C, similarly soaked, the gasolene pressure-gage indicated thirty-five pounds ten minutes after the steam was turned on, and the temperature at that time was 150° Fahrenheit. The exposure continued for one hour and fifty minutes, the maximum pressure being eighty-three pounds, the maximum temperature 236° Fahrenheit, the average pressure sixty-five pounds, and the average temperature 215° Fahrenheit. The result was the same as in experiment C.

From these experiments it may be deduced that the temperature, not exceeding 300° Fahrenheit, may vary down to the lowest temperature sufficient to vaporize the solvent used and develop some pressure therein; also, that the higher the average pressure maintained the shorter the time required, and it will be noticed that with a given quality of rubber the product of the time by the average pressure is approximately constant.

From all my experiments I have concluded that it is important to maintain the substantially saturated condition of the rubber during the treatment, although the solvent with which it is thus saturated may be vaporized by the heat of the solvent employed in the chamber; but being thus vaporized under the pressure developed in the chamber it is retained in the interstices of the rubber after it is thus vaporized, so that the substantially saturated condition continues.

I do not limit myself strictly to any of the specific details mentioned, nor to the use of such an apparatus as I have described; but I claim—

1. The process of devulcanizing rubber, which consists in first thoroughly soaking the rubber with a solvent of rubber and sulfur whose vaporizing-point is below the melting or disorganizing point of rubber, and maintaining it in such saturated condition while heating it in a vapor of such solvent, to a temperature adequate to vaporize the saturating solvent, but lower than the melting or disorganizing point of rubber, until the rubber is devulcanized.

2. The process of devulcanizing rubber, which consists in saturating it with a solvent of rubber and sulfur adapted to vaporize at a temperature below the melting or disorganizing point of rubber, and maintaining it in such saturated condition by the pressure of vapor of such solvent while heating it in such vapor, to a temperature adequate to maintain the pressure therein, but lower than the melting or disorganizing point of rubber, until devulcanization is effected and the rubber is in condition to be massed.

In testimony whereof I have hereunto set my hand, in the presence of two witnesses, at Chicago, Illinois, this 17th day of August, 1897.

PERCY L. CLARK.

Witnesses:
CHAS. S. BURTON,
JEAN ELLIOTT.